Patented Apr. 4, 1944

2,345,751

UNITED STATES PATENT OFFICE 2,345,751

PRODUCTION OF DIOLEFINIC HYDROCARBONS

Vladimir N. Ipatieff, Chicago, Ill., assignor to Universal Oil Products Company, Chicago, Ill., a corporation of Delaware No Drawing. Application April 12, 1941, Serial No. 388,269

4 Claims. (Cl. 260—681)

This invention relates to the conversion of isopropyl alcohol into diolefinic hydrocarbons. More specifically it is concerned with a process involving the use of a particular catalyst and specific conditions of operation whereby isopropyl alcohol can be converted efficiently into hexadienes.

In one specific embodiment the present invention comprises a process for producing a diolefinic hydrocarbon from isopropyl alcohol which comprises subjecting said alcohol to contact with a magnesium oxide catalyst at a temperature of from about 400° to about 500° C.

This invention relates to the production of diolefin hydrocarbons from isopropyl alcohol by treating this alcohol with magnesium oxide catalyst at a temperature of from about 400° to about 500° C. and preferably within the approximate limits of about 400° and 450° C. The operating pressure is substantially atmospheric or subatmospheric and the hourly charging rate of alcohol is generally up to about 4 times the volume of the catalyst. By the process of this invention isopropyl alcohol is converted into a diolefinic hydrocarbon, namely, a hexadiene, containing twice the number of carbon atoms per molecule as present in said alcohol.

While the reactions involved in the process of this invention are not understood clearly or completely, they probably comprise essentially a cooperation of dehydration, condensation, and dehydrogenation reactions producing one or more types of diolefinic hydrocarbons.

A preferred catalyst utilizable in the process of this invention is obtained by precipitating magnesium hydroxide or magnesium carbonate by the addition of a solution of a base or of a water-soluble carbonate to an aqueous solution of a magnesium salt followed by washing to remove water-soluble impurities from the precipitated material, then drying and heating the precipitate to drive off water or carbon dioxide and form substantially pure magnesium oxide.

Magnesium oxide, otherwise known as magnesia, obtained from either of the above indicated sources, may be employed in the form of a fixed bed through which the reaction mixture is passed or it may be utilized as powder in a substantially fluid type of operation. The magnesia catalyst may be formed into particles by a number of methods such as pelleting into bodies of regular shape and size or pressing the powdered magnesia to form a cake which is crushed and screened to give granules of irregular shape and size. Material which has been made plastic by addition of a liquid as water may also be extruded and cut into pieces which are then dried to produce formed particles utilizable as reactor packing material.

The different forms of magnesia which may be employed as catalysts for the present process are not necessarily equivalent in their action and the operating conditions employed depend upon the activity of the catalyst utilized.

The following specific examples are introduced to show results obtained in the operation of the process, although these data are not presented with the intention of unduly limiting the broad scope of the invention.

Example I

During a period of 7.5 hours, 242 volumes of isopropyl alcohol was passed at 465° C. over 25 volumes of magnesium oxide obtained by precipitation in the form of the hydroxide. During this treatment 40,000 volumes of gas was obtained and a liquid product was formed containing 30 volumes of unsaturated liquid hydrocarbons boiling between about 56° and 76° C. The unconverted isopropyl alcohol was suitable for recycling to further catalytic treatment.

The unsaturated hydrocarbons thus obtained in a yield of about 15% per pass based upon the isopropyl alcohol charged, upon catalytic hydrogenation were found to combine with 2 molecular proportions of hydrogen to yield isohexane, and were thus shown to be diolefinic.

The 40,000 volumes of gaseous products formed contained about 94% of hydrogen as indicated by the following analysis: olefins 4.1%; oxygen, 0.3%; hydrogen, 94.1%; paraffins, 0.9%; and nitrogen, 0.6%. The paraffins present in the gas probably consisted of a mixture of methane and ethane since the gas analysis showed a carbon index of 1.3 for the paraffins present.

Example II

During a period of 10 hours, 570 volumes of isopropyl alcohol was passed at 470° C. over 25 volumes of the magnesia catalyst indicated in Example I. The 206 volumes of liquid products obtained after washing with water to remove unconverted isopropyl alcohol, yielded 67 volumes of a hydrocarbon layer consisting essentially of diolefinic hydrocarbons. The total yield of diolefinic hydrocarbons was about 20% of the theoretical based upon the quantity of isopropyl alcohol passed over the catalyst. More than one-half of the diolefin hydrocarbon fraction formed in this run boiled from about 70° to about 80° C.

Other runs made in the presence of commercial magnesium oxide gave lower yields of diolefinic hydrocarbons. Further, it was found that the diolefin yield per pass was increased by decreasing the charging rate as measured by the liquid space velocity of charge.

The nature of the present invention and particularly its commercial value are evident from the preceding specification and examples, although neither section is intended to unduly limit its generally broad scope.

I claim as my invention:

1. A process for producing a diolefinic hydrocarbon from isopropyl alcohol which comprises subjecting said alcohol to contact with a catalyst consisting essentially of magnesium oxide at a temperature above 400° and below 500° C.

2. A process for producing a diolefinic hydrocarbon from isopropyl alcohol which comprises subjecting said alcohol to contact with a catalyst consisting essentially of magnesium oxide at a temperature above 400° and below 500° C. under a pressure of from subatmospheric to substantially atmospheric.

3. A process for producing a diolefinic hydrocarbon from isopropyl alcohol which comprises subjecting said alcohol at a temperature above 400° and below 500° C. to contact with a catalyst consisting essentially of magnesium oxide formed by treating a water-soluble magnesium salt with a base to form a precipitate of magnesium hydroxide, washing said precipitate to substantially remove water soluble impurities, drying and calcining the washed precipitate to form substantially pure magnesium oxide.

4. A process for producing a hexadiene from isopropyl alcohol which comprises subjecting said alcohol at a temperature above 400° and below 500° C. under a pressure of from subatmospheric to substantially atmospheric to contact with a catalyst consisting essentially of magnesium oxide formed by treating a water-soluble magnesium salt with a base to form a precipitate of magnesium hydroxide, washing said precipitate to substantially remove water-soluble impurities, drying and calcining the washed precipitate to form substantially pure magnesium oxide.

VLADIMIR N. IPATIEFF.